Feb. 5, 1929.

T. J. STRICKLER 1,700,816

AUTOMATIC CARBURETOR CONTROL AND MANIFOLD
AIR INLET FOR AUTOMOBILE ENGINES

Filed March 2, 1927

Inventor

T. J. Strickler;

By Clarence A. O'Brien
Attorney

Feb. 5, 1929.

T. J. STRICKLER 1,700,816

AUTOMATIC CARBURETOR CONTROL AND MANIFOLD
AIR INLET FOR AUTOMOBILE ENGINES

Filed March 2, 1927  2 Sheets-Sheet 2

Inventor
T. J. Strickler

By Clarence A. O'Brien
Attorney

Patented Feb. 5, 1929.

1,700,816

UNITED STATES PATENT OFFICE.

THOMAS J. STRICKLER, OF WASHINGTON, DISTRICT OF COLUMBIA, ASSIGNOR OF ONE-HALF TO CHARLES D. HOLDEN.

AUTOMATIC CARBURETOR CONTROL AND MANIFOLD AIR INLET FOR AUTOMOBILE ENGINES.

Application filed March 2, 1927. Serial No. 172,129.

This invention relates to new and useful improvements in fuel regulating devices for automobile engines, particularly those of the Ford type, and has for its primary object to provide means automatically operable by the adjustment of the engine distributor to regulate the carburetor needle valve, and to control an air supply to the engine manifold.

In carrying out the present invention I provide means operatively associated with the carburetor needle valve and the distributor control mechanism of the engine to automatically adjust the carburetor to a lean or rich mixture when the distributor is moved to retarded and advanced positions respectively, further means being provided to automatically govern the inlet of a supply of natural air and a supply of heated vapor or steam into the intake manifold simultaneously with the operation of the spark control to advanced position and operable reversely when the spark is moved to retarded position.

By actual experiment it has been ascertained that when running on level roads, an automobile engine will operate efficiently by a relatively lean fuel mixture and this especially when the spark is moved to advanced position, resulting in a considerable saving of gasoline and at the same time increasing the operating efficiency of the engine.

By reason of an automatic carburetor control and manifold air inlet of this character there will be little or no carbon formation within the engine cylinders or valves by reason of the fact that a supply of steam or heated vapor is injected into the engine manifold simultaneously with the operation of the spark control to advanced position, said steam or heated air being extracted from the overflow pipe of the engine radiator.

In further carrying out the invention means is provided whereby natural air may be taken into the manifold when the spark is at advanced position, this air intake mechanism being so constructed as to permit a small charge of oil to be injected into the engine cylinder for lubricating and scavenging the valves and upper ends of the cylinders.

In summing up the various objects of the invention, it will at once be apparent that the primary object is to provide automatic means for cutting down the supply of fuel to the carburetor and for simultaneously permitting of the intake of natural air and heated vapor or steam into the engine manifold simultaneously with the movement of the spark control to advanced position.

With the foregoing and other objects in view as the nature of the invention will be better understood, the same comprises the novel form, combination and arrangement of parts hereinafter more fully described, shown in the accompanying drawings and claimed.

In the drawing wherein like numerals of reference indicate corresponding parts throughout the several views thereof:

Figure 1:
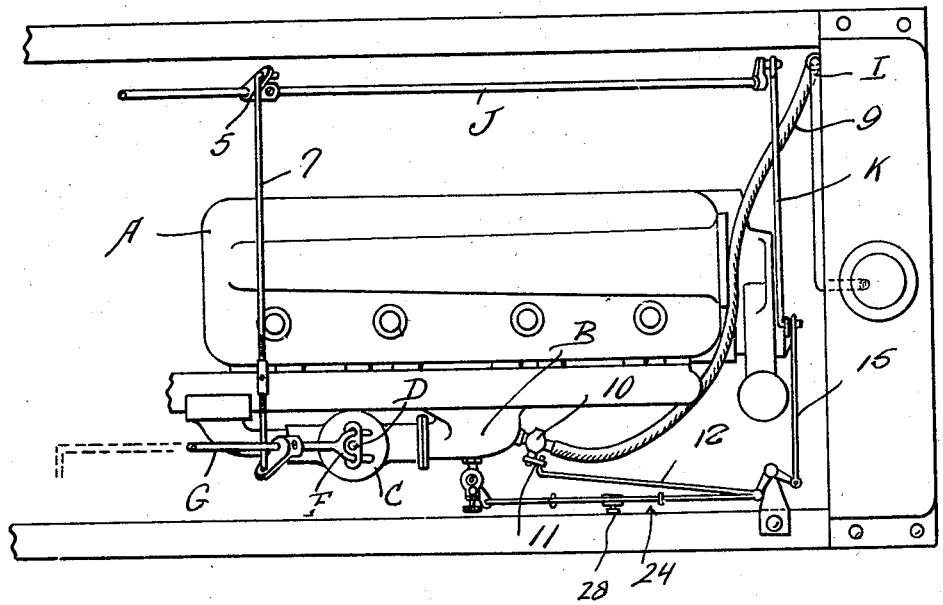
Figure 1 is a fragmentary top plan view of an automobile engine constructed with an automatic carburetor control and manifold air inlet in accordance with the present invention.
Figure 5:
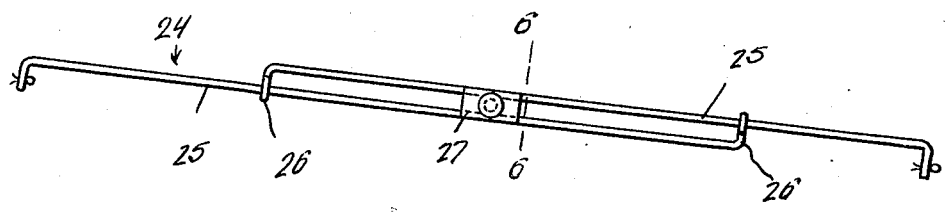
Figure 5 is a side elevation of an adjustable connecting bar between the natural air inlet valve and the engine spark control mechanism.
Figure 6:
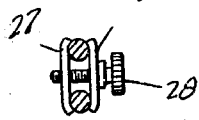
Figure 6 is a detail transverse section taken substantially upon the line 6—6 of Figure 5 for more clearly disclosing the means whereby this adjustable bar may be rigidly maintained in predetermined adjusted relation.

Now having particular reference to the drawings, A designates the engine of a well known type of automobile equipped with the usual fuel intake manifold B having communication with the carburetor C, which carburetor is equipped with a needle valve D having a cross plate E upon its upper end, the opposite ends of said cross plate being formed with openings as indicated in Figure 1.

Arranged within the openings of this plate E are the fingers of the forked end F of the needle valve adjustment rod G that extends through the dash board of the automobile for the purpose of permitting of the proper adjustment of said needle valve which needle valve regulates the mixture of the fuel being extracted from the carburetor. Furthermore, engines of this character are equipped with the usual distributor H operatively connected with the lower end of the spark rod J by rod K connected at its opposite ends to the usual arm upon the lower end of the spark rod and to the usual lug upon the distributor shell as clearly disclosed in Figure 2.

Figure 2:
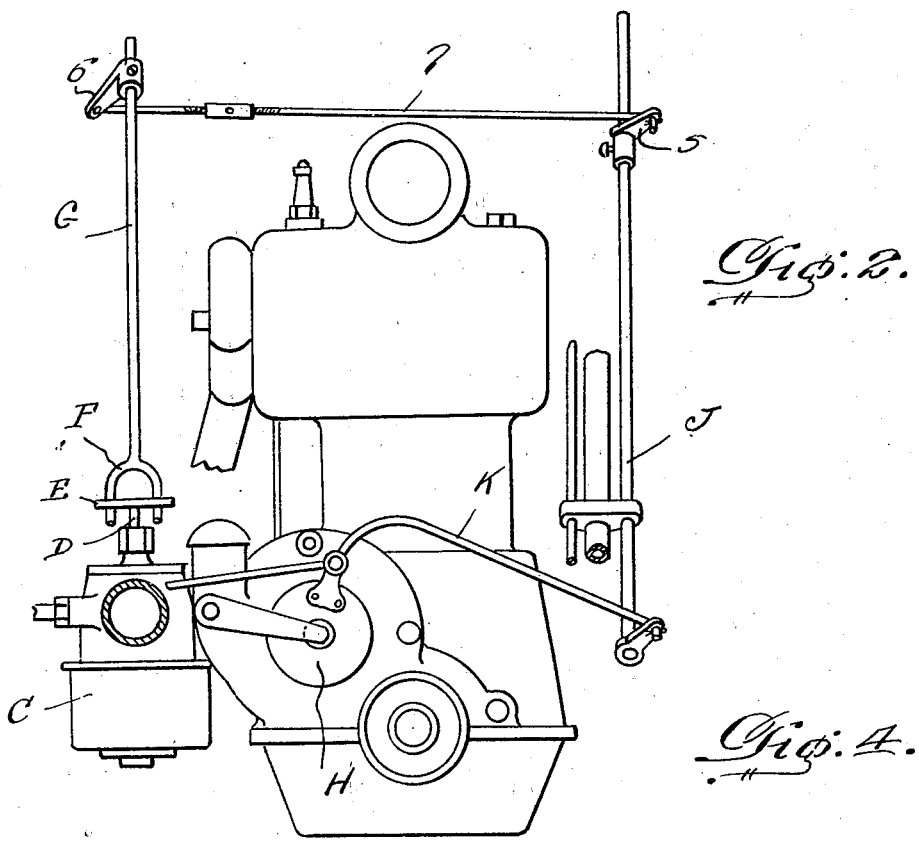
Figure 2 is a front end elevation thereof.

In carrying out my invention the spark rod J at a point above the engine A is equipped with an adjustable arm 5, while the carburetor needle valve control rod G is equipped with a similar arm 6, said arms being interconnected by a cross rod 7, the length of which may be adjusted preferably by reason of the turn buckle construction disclosed in Figure 2.

The connection between the carburetor rod G and spark rod J is such that when the rod J is turned to move the shell of the distributor H to advanced position, the needle valve D of the carburetor will be turned downwardly for affecting a lean mixture of the fuel being dispensed by said carburetor.

The engine radiator overflow pipe L is in this instance equipped at its lower open end with a nipple 8 to which is attached one end of a flexible hose 9, the opposite end of this hose being attached to the intake nipple of a conventional pet cock 10, the exhaust nipple of which is arranged in the intake manifold B as clearly disclosed in Figure 1. As disclosed in this figure the stem of this pet cock is equipped with an arm 11 to which is attached one end of a rod 12. A suitable bracket is riveted to the frame bar of the engine adjacent the manifold B toward the forward end thereof and to the inner end of which is pivotally connected a bell crank to the inner arm of which is pivotally connected said pet cock control rod 12. The outer arm of this bell crank 14 is operatively attached to the shell of the distributor H by a rod 15, said pet cock 10 together with its connections between the distributor shall be such that as the distributor is moved to advance position, the pet cock will be moved to open position so that a supply of heated air or steam will be taken into the manifold simultaneously with the advance of the spark.

Figure 3:
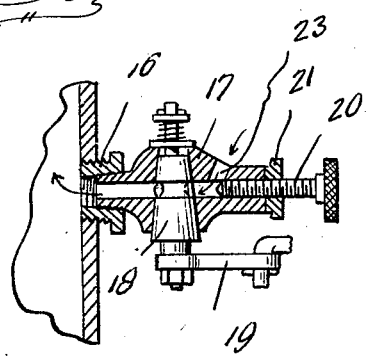
Figure 3 is a detail section through the natural air inlet valve having communication with the engine inlet manifold.
Figure 4:
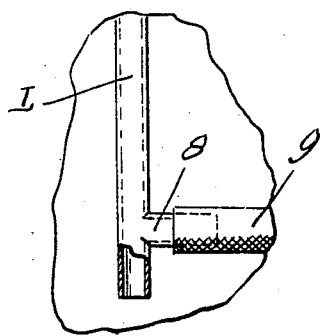
Figure 4 is a fragmentary view partially in cross section of the lower end of an engine radiator overflow pipe, the construction of which is slightly altered in accordance with the present invention.

Arranged within the front face of the intake manifold B is a threaded nipple 16 within which is threaded the exhaust nipple of a pet cock 17, the stem of the core 18 of which is equipped at its lower end with an arm 19. Furthermore, the intake nipple of this pet cock is internally threaded for receiving a threaded needle valve 20 that may be locked in predetermined position within the cock by a lock nut 21. The inlet nipple is formed at a point adjacent the core and at its top side with a vent opening 22, see Figure 3.

Obviously the air enters the cock through the vent 23 and by adjusting the needle valve 20, the area of the vent opening at its point of communication with the interior of the cock may be regulated so as to control the amount of air entering therein commensurate with the relative position of the core 18 within the cock casing. The arm 19 of the pet cock core stem is connected to one end of an adjustable length bar 24 the opposite end of which is attached to the inner arm of the bell crank 14 previously mentioned. This adjustable bar consists of a pair of rods 25—25 the inner ends of which are provided with right angular eyes 26—26 through which the complemental rod is slidably arranged. Between the eyes 26—26 there is arranged over the rods a pair of clamp plates 27—27 interconnected by a screw 28, this clamp permitting the rod to be rigidly secured in predetermined adjusted position so that the degree of movement of the core 18 of the pet cock 17 may be regulated simultaneously with the actuation of the distributor shell. At this point it may be well to state that the cores of the pet cocks 10 and 17 are so disposed within the cock casing that the cock 10 will move to open position just slightly prior to the movement of the core of the cock 17 to open position so that heated vapor or steam may be taken into the manifold prior to the inlet of the natural atmosphere resulting in the proper vaporization of the fuel mixture and the subsequent efficient operation of the engine.

In view of the foregoing description when considered in conjunction with the accompanying drawings it is believed that the specific operation and construction of a device of this character will be readily appreciated by those skilled in the art, even though I have herein shown and described the invention as consisting of certain detail structural elements it is nevertheless to be understood that I do not desire to be limited to such a disclosure insomuch as some departures may be had therefrom without affecting the spirit and scope of the appended claims.

Having thus described the invention, what I claim as new and desire to secure by Letters Patent is:—

1. In combination with an internal combustion engine spark control mechanism, and the engine carburetor needle valve, means operatively associated with the spark control mechanism and said needle valve for causing the adjustment of the same simultaneously with the actuation of said mechanism, and further means for admitting a supply of air to the engine intake manifold simultaneously with the advance of the spark and the turning down of the needle valve.

2. In combination with an internal combustion spark control mechanism, and the engine carburetor needle valve, means operatively associated with the spark control mechanism and said needle valve for causing the adjustment of the same simultaneously with the actuation of said mechanism, and further means for admitting a supply of vapor from the engine radiator overflow pipe into the engine intake manifold simultaneously with the advancing of the spark and the turning down of the needle valve.

3. In combination with an internal combustion engine spark control mechanism, an air intake valve associated with the intake manifold of the engine and means between said valve and said spark control mechanism for causing the opening of the valve simultaneously with the movement of the mechanism to spark advanced position, and further means associated with the intake manifold and said spark control mechanism for admitting a supply of vapor from a radiator to the manifold simultaneously with the movement of the mechanism to said advanced position.

4. In combination with an internal combustion engine spark control mechanism, an air intake valve associated with the intake manifold of the engine and means between said valve and said spark control mechanism for causing the opening of the valve simultaneously with the movement of the mechanism to spark advanced position, and further means associated with the intake manifold and said spark control mechanism for admitting a supply of vapor from a radiator to the manifold simultaneously with the movement of the mechanism to said advanced position, said manifold means being so constructed and related as to cause the admission of the vapor to the manifold just prior to the admission of the air thereto.

5. In a structure of the class described, in combination, an automobile radiator, an engine, an intake manifold carried by the engine, a carburetor associated with the manifold, a distributor on the engine, a spark control rod, an operating connection between said rod and distributor, a vapor supply valve for said intake manifold, a vapor supply hose connected with said valve and said radiator, an auxiliary air intake valve on said intake manifold, a bell crank, an operating link for the bell crank connected with said distributor, and operating members connected with said vapor valve and auxiliary air valve and also with said bell crank for operating said valves in succession, a needle valve for controlling the supply of fuel to the carburetor, a control rod for said needle valve, and an operating connection between said needle valve control rod and the aforesaid spark control rod.

In testimony whereof I affix my signature.

THOMAS J. STRICKLER.